United States Patent
Leenstra et al.

(10) Patent No.: US 7,844,799 B2
(45) Date of Patent: Nov. 30, 2010

(54) METHOD AND SYSTEM FOR PIPELINE REDUCTION

(75) Inventors: Jens Leenstra, Bondorf (DE); Antje Mueller, Boeblingen (DE); Juergen Pille, Stuttgart (DE); Dieter Wendel, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1676 days.

(21) Appl. No.: 09/683,383

(22) Filed: Dec. 20, 2001

(65) Prior Publication Data

US 2003/0208672 A1 Nov. 6, 2003

(30) Foreign Application Priority Data

Dec. 23, 2000 (EP) .................... 00128489

(51) Int. Cl.
G06F 9/30 (2006.01)
G06F 9/34 (2006.01)

(52) U.S. Cl. ...................... 712/216; 712/219
(58) Field of Classification Search ................ 712/216, 712/217, 218, 219
See application file for complete search history.

(56) References Cited

U.S. PATENT DOCUMENTS

| 5,404,470 | A | | 4/1995 | Miyake | |
|---|---|---|---|---|---|
| 5,471,626 | A | * | 11/1995 | Carnevale et al. | 712/219 |
| 5,737,562 | A | * | 4/1998 | Caulk, Jr. | 712/218 |
| 5,742,780 | A | * | 4/1998 | Caulk, Jr. | 712/206 |
| 5,778,248 | A | * | 7/1998 | Leung | 712/23 |
| 5,974,526 | A | | 10/1999 | Garg et al. | |
| 5,996,063 | A | * | 11/1999 | Gaertner et al. | 712/215 |
| 6,108,771 | A | * | 8/2000 | Gaertner et al. | 712/217 |
| 2002/0199085 | A1 | * | 12/2002 | Norden et al. | 712/219 |

FOREIGN PATENT DOCUMENTS

EP 0 376 004 A 7/1990
EP 0 606 697 A 7/1994

OTHER PUBLICATIONS

Kubiatowicz, John. CS252 Graduate Computer Architecture Lecture 7 Reorder Buffers and Explicit Register Renaming. © Sep. 2000. Slides 7.24-7.55.*
Moudgill,Mayan; Pingali, Keshav; and Vassiliadis, Stamatis. Register Renaming and Dynamic Speculation: an Alternative Approach. IEEE © 1993. pp. 202-213.*
Gonzalez, Antonio; Gonzalez, Jose; and Valero, Mateo. Virtual-Physical Registers. IEEE © 1998.*

* cited by examiner

*Primary Examiner*—Aimee J Li
(74) *Attorney, Agent, or Firm*—Ido Tuchman; E. Dwayne Nelson

(57) ABSTRACT

A method and system for operating a high frequency out-of-order processor with increased pipeline length. A new scheme is disclosed to reduce the pipeline by the detection and exploitation of so called "no dependency" for an instruction. A "no dependency" signal tells that all required source data is available for the instruction at least one cycle before the source data valid bit(s) are inserted into the issue queue. Therefore, one or more stages of the pipeline are bypassed.

16 Claims, 10 Drawing Sheets

METHOD AND SYSTEM FOR PIPELINE REDUCTION

This application is related to U.S. patent application Ser. No. 09/683,351 entitled "Method For Handling 32 Bit Results For An Out-Of-Order Processor With A 64 Bit Architecture", filed Dec. 18, 2001, and to be U.S. patent application entitled "Rename Finish Conflict Detection and Recovery". The subject matter of these applications are incorporated herein by reference.

BACKGROUND OF INVENTION

1. Field of the Invention

The present invention relates to improvements of out-of-order CPU architectures regarding performance purposes. In particular it relates to an improved method and system for operating a high frequency out-of-order processor with increased pipeline length.

2. Description of the Prior Art

The present invention has a quite general scope which is not limited to a vendor-specific processor architecture because its key concepts are independent therefrom.

Despite of this fact it will be discussed with a specific prior art processor architecture.

The prior art out-of-order processor, in this example an IBM S/390 processor has as an essential component a so-called Instruction Window Buffer, further referred to herein as IWB.

After the instructions have been fetched by a fetch unit, passed through a decode and branch prediction unit, stored in the instruction queue and have been renamed in a renaming unit they are stored in a part of the IWB called reservation station. From the reservation station the instructions may be issued out to a plurality of instruction execution units abbreviated herein as IEU, and the speculative results are stored in a temporary register buffer, called reorder buffer, abbreviated herein as ROB. These speculative results are committed (or retired) in the actual program order thereby transforming the speculative result into the architectural state within a register file, a so-called Architected Register Array, further abbreviated herein as ARA. In this way it is assured that the out-of-order processor (also referred to herein as an outprocessor) with respect to its architectural state behaves like an in-order processor.

Within the above summarized scheme, "Renaming" is the process of allocating a new register in the reorder buffer for every new speculative execution result. Renaming is done to avoid the so-called "write-after-read" and "write-after-write" hazards that otherwise would prevent the out-of-order execution of the instructions. Each time a new register is allocated, a destination tag—the instruction ID—is associated with this register. With the help of this tag the speculative result of the execution is written in the newly allocated register. Later on, the incompletion process sets the architectural state by writing the speculative data into a architectural register or by setting a flag bit that specifies that the data has become part of the architectural state. In this way, the outprocessor behaves from an architectural point of view as if it executes all instructions in an in-order sequence.

In a state of the art approach renaming is done according to the schemes shown in FIG. 1 and FIG. 2. In the upper portion of the figures the pipeline stages are illustrated whereas in the respective bottom part a structural overview is given. The main difference between the two schemes is the storing of source data or not of source data, respectively, into the issue queue. Therefore, the cycle in which the source data is read from the register file is different.

In particular, the first approach is illustrated in FIG. 1. During renaming 110 the register addresses are assigned in which the source data for the instruction resides. Further, a new register is allocated for each dispatched instruction in which the speculative result of the instruction will be stored after execution. Next, 110, the instruction is written into the issue queue 160, together with all its control bits (like opcode), source data valid (indicates if the source data is already available in the register file) and other bits as resulting from the renaming process. The wake up logic 170 of the issue queue will monitor, 120, the results produced by the execution units and will set the source to valid for those instructions that are waiting in the issue queue for the specific result. The select logic 170 will select—commonly in an "oldest-first" manner those instructions that will be issued to the execution units. Once the select logic has selected the instruction that will be issued, the source address will be sent in the next cycle to the register file and the source data will be read from there, 130. Finally, in the last cycle as shown in FIG. 1 the execution 140 of the instruction is performed in an execution unit 190 thereby calculating the speculative result.

In FIG. 2 the alternative pipeline scheme is shown. The difference is that in this case the data is read from the register file 260 directly after renaming 210, 250. A undefined value is read in case the source data is not yet available. Next, the instruction is inserted, 220, into the issue queue 270, together with its source data read from the register file. It should be noted that the wake-up logic 280 is required to firstly, set the valid bit of the source data and secondly, take care that the speculative results produced by the execution units 290 are written into the source data fields of the specific instruction that uses the speculative result as an input.

Both pipeline models are currently in use. The MIPS R10000, HP PA and the DEC 21264 are examples of processors that use the model shown in FIG. 1. On the other hand, Intel Pentium, Power PC 604 and HAL SPARC64 are based on the model shown in FIG. 2.

With the increasing number of circuits that fit onto a chip, processor designers enhance the performance of a processor by expanding the number of queue entries, by providing more execution units and especially, by designing the processor for a much higher frequency. Thereby, the trend in industry is especially towards very high frequency designs.

For processors with such a very high frequency target, the pipeline schemes shown in FIGS. 1 and 2 are no longer applicable since the delay of the logic between the pipeline registers is too large. To support a much higher frequency the pipeline depth has to increase. For example, the pipeline shown in FIG. 3 has been published in "Intel Willamette Processor", C-t Magazin, Vol 5, 2000, pp 16 The total pipeline has 20 stages, which is double the number of pipeline stages as its predecessor, the "Intel P6 processor" had.

The introduction of a much deeper pipeline has the advantage that the processor can run on a much higher frequency and therefore support a much higher throughput of the instructions. The drawback is, however, that the number of cycles needed for each Instruction to go through the pipeline also increases. Since the performance of the processor "MIPS" is equal to frequency divided by cycles per instructions (CPI) the performance gain by introducing a very deep pipeline remains limited.

Therefore, techniques that can reduce the pipeline length in performance critical cases are of great importance to increase the overall processor performance.

SUMMARY OF THE INVENTION

It is thus an objective of the present invention to reduce the pipeline length in performance-critical cases.

These objects of the invention are achieved by the features stated in enclosed independent claims. Further advantageous arrangements and embodiments of the invention are set forth in the respective subclaims.

According to the primary aspect of the present invention a method for operating an out-of-order processor is disclosed in which a rename process is comprised of the pipeline an instruction stream is processed with, which comprises the following steps: for the detection of a dependency, determining for each current instruction involved in the renaming process that a logic target address of one or more instructions stored in a temporary buffer associated with a pipeline process downstream of the current instruction is not the same as a logic source address of the current instruction; generating a no-dependency-signal associated with the current instruction; and forwarding the signal for exploiting the signal in order to control the processing of the current instruction in order to bypass a portion of the pipeline.

A respective inventive processing system has means for performing the method according to the above said primary aspect or further advantageous aspects as they were mentioned above.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

The present invention is illustrated by way of example and is not limited by the shape of the figures of the accompanying drawings.

DETAILED DESCRIPTION

Figure 1:
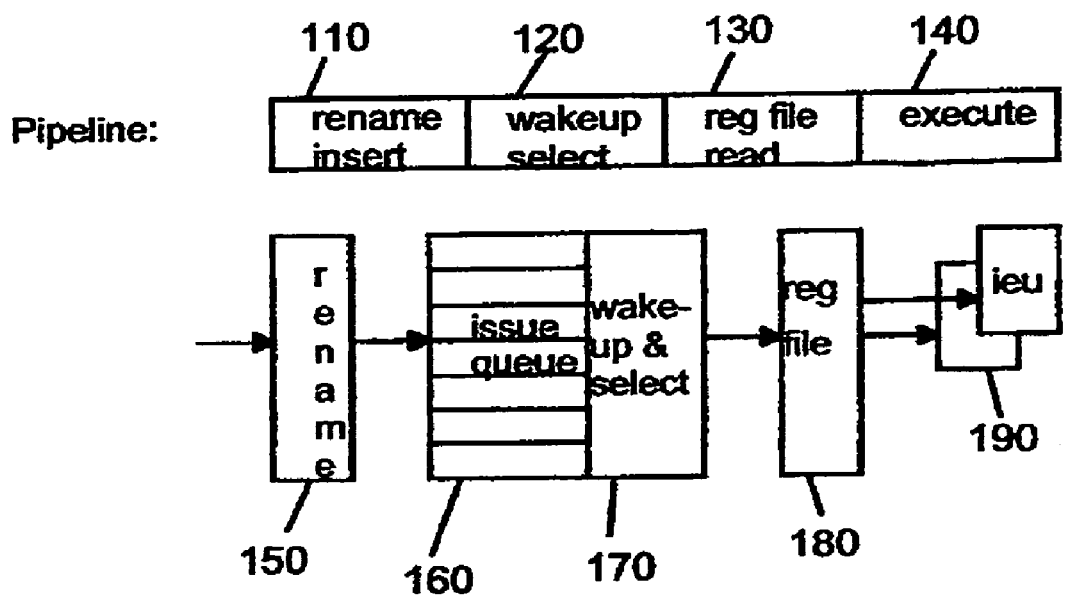
FIG. 1 is a schematic diagram showing the essentials of a prior art renaming pipeline without storage of source data in the issue queue.

The present invention proposes a new scheme to bypass the pipeline by the detection and exploitation of a so called "no-dependencies". A respective "no dependency" signal tells that all required source data is available for the instruction at least one cycle before the instruction tag and the source data valid bit(s) are inserted into the issue queue. Therefore, one or more stages of the pipeline are bypassed advantageously. Bypassing the pipeline stages for this "no dependency" conditions is particularly important since it always occurs when the issue queue is empty and because it mostly occurs when the issue queue is relatively empty and therefore not enough instructions being in the queue itself to keep the IEUs busy. Therefore introducing such a bypass reduces effectively the performance drawback of a longer pipeline.

It is contemplated that operations described herein can be implemented in either hardware or software. In this basic approach at least the instructions with all source data in an architected state (data resides in the register file) are covered by the dependency check.

Further, when the step of generating a "no dependency" signal comprises the step of comparing a plurality of logic target register addresses and the logic source register address of the current instruction, in case of a match, and the step of generating a dependency for the respective source register (and thereby the instruction becomes dependent on another older instruction), the simplest way to determine "no dependency" is disclosed because this corresponds straight-forward to the definition of dependency.

Further, when "valid"-bits of non-target registers stored in a storage as e.g., the reorder buffer, which is associated with speculatively calculated instruction result data are involved into the no generation, then the advantage is that additional information is made available saying if a respective target register data stored in the reorder buffer is valid or not. Thus, the no-dependency signal generation covers more cases, i.e., the speculatively calculated cases too, i.e., the method is more effective.

Further, the concepts of the present invention can be applied as well in a mapping-renaming scheme. Then a mapping table entry is addressed with a logical source register address of the current instruction, whereby the mapped physical target register address is determined, then, a committed-status-flag in said entry is read, and thus, it is known where the data resides, in the ROB (non-committed), or already in the ARA (committed), then, the logic target register address and the logic source register address of the current instruction are compared, and in case of a match, a dependency-signal is generated for the respective source register.

In case of a content-addressable memory (CAM) renaming scheme, according to a preferred embodiment, the means for determining the dependency of a current instruction comprises a compare logic in which all instructions to be checked for dependency are involved, and a post-connected OR gate.

This embodiment can be further advantageously implemented when it comprises a plurality of AND gates the input of which comprises the target register "valid-bits" signal and a respective compare logic output signal.

Figure 4:
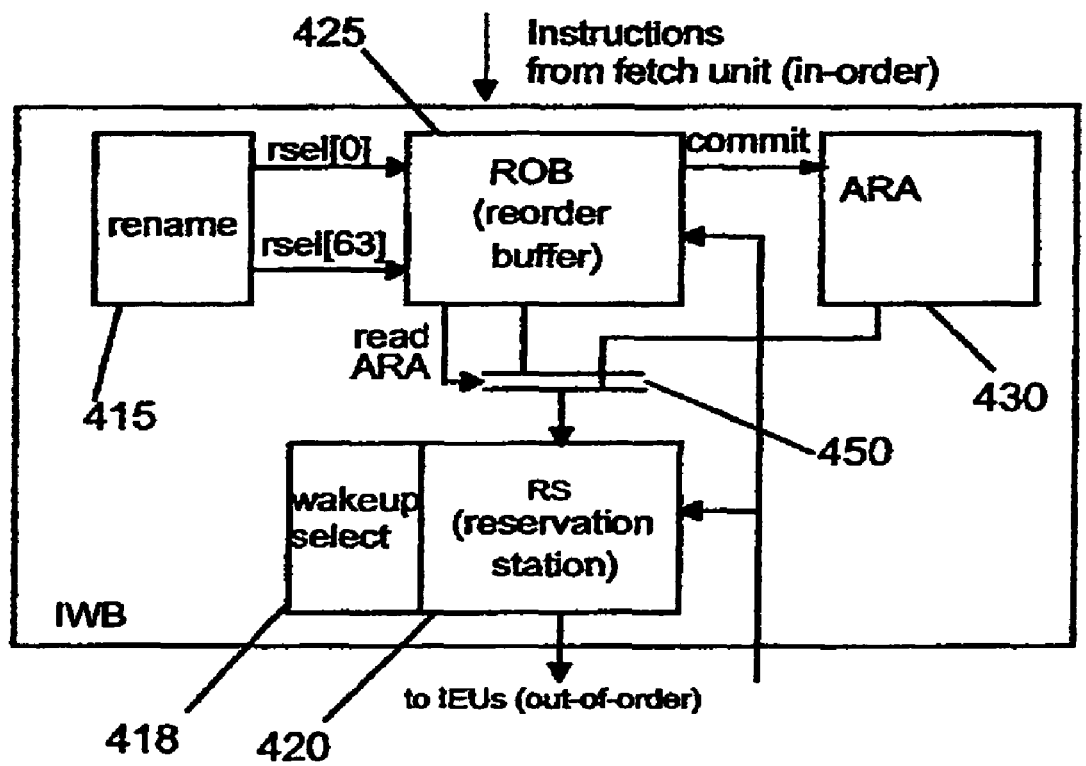
FIG. 4 is a schematic diagram showing the essentials of a prior art Instruction Window Buffer (IWB).

With general reference to the figures and with special reference now to FIG. 4 the present invention will be first described in the context of a preferred embodiment thereof, in an implementation in which the before mentioned Instruction Window Buffer (IWB) is provided with inventional additional logic.

After disclosure of said IWB—dedicated embodiment the present invention will be discussed and illustrated further in relation to its extended range of use when a further, different renaming scheme implementation is used. Finally, it will be shown how the invention can also be used to reduce the read Register File cycle(s).

Figure 5:
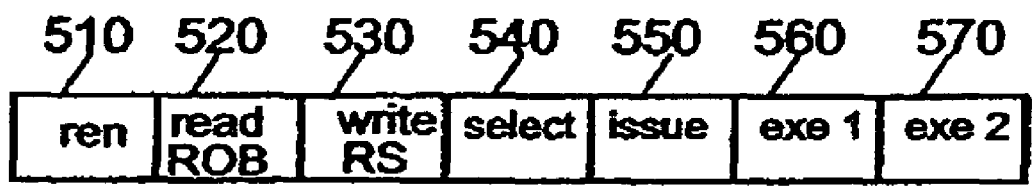
FIG. 5 is a schematic diagram showing the essentials of a prior art renaming pipeline applied in FIG. 4.

With reference to FIG. 4 the IWB functional blocks are shown schematically. In FIG. 5 the respective pipeline scheme is shown. The IWB implementation scheme uses the basic pipeline scheme of FIG. 2 where the data is stored in the queue. It is, however, like the processor in ref 1 designed for a much higher frequency. Therefore, the pipeline shown in FIG. 5 has additional cycles in comparison to FIG. 2 to support this frequency target.

Figure 2:
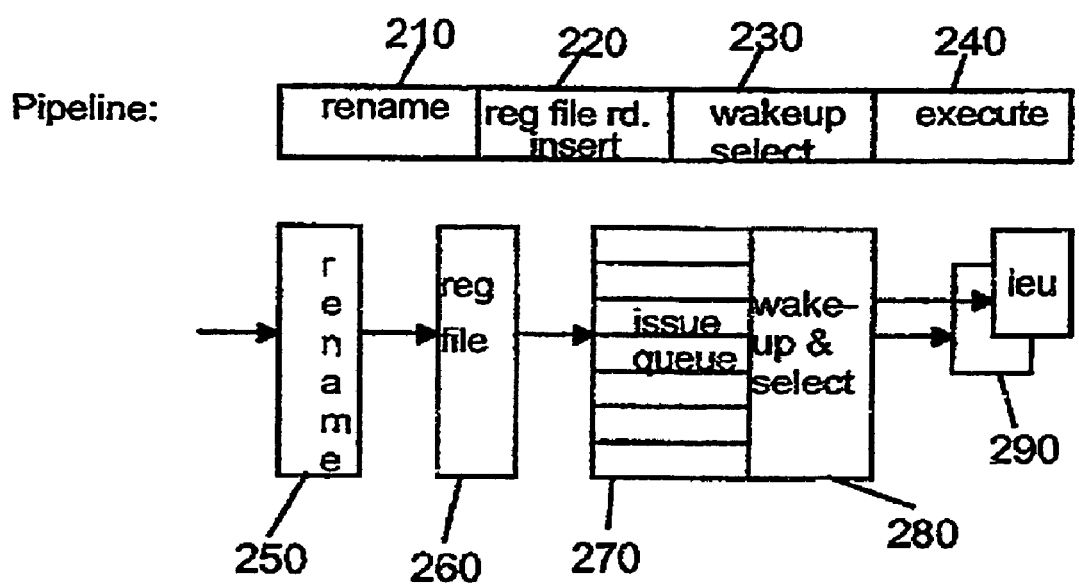
FIG. 2 is a schematic diagram showing the essentials of a prior art renaming pipeline with storage data in the issue queue.
Figure 3:
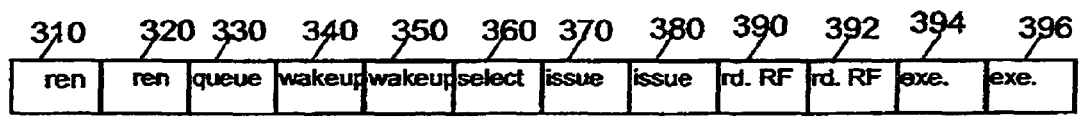
FIG. 3 is a schematic diagram showing the essentials of a prior art highpipeline.

The more detailed operation of the FIG. 5 IWB pipeline will now be explained with reference to FIG. 4. The issue queue that stores source data is referred to herein as reservation station (RS) 420. Furthermore, the Register File found in FIGS. 1 and 2 is here partitioned into a so called ReOrder Buffer (ROB) 425 storing the speculative results and a architectural register array (ARA) 430 storing the architectural state of the processor.

The fetch unit dispatches up to 4 instructions each cycle to the IWB in program order. The IWB pipeline starts with renaming—510—the up to 4 dispatched instructions. The renaming process, compares the source registers with the target registers of previous instruction and in case of a match, i.e., a dependency is found, then, the ROB entry of the target is assigned to the source register. Furthermore, new ROB entries are allocated for the target register of the instruction. In this ROB entry the speculative results will be stored after execution.

According to the present inventional embodiment the detection of a dependency of a source register with the target register of an instruction that resides in the IWB is done by the renaming logic by comparing the source operands with the target operand stored for each entry.

Next, the match (0 . . . 63) signals generated for each entry will be ANDed with a so called "current_bit (0 . . . 63)". A current_bit(i) is only set to "ON" when an instruction i is the youngest instruction in the IWB for the specific logical target register address. It should be noted that the ANDing the match (0 . . . 63) with the current_bit (0 . . . 63) string thereby generating the read select RSEL (0 . . . 63) string is needed, since several matches may be found for the same logical target address. However, only the match with the youngest instructions specifies the correct dependency. It should be noted further that instead of a current bit also a priority filter logic could be used to filter out the youngest match and thereby generating the RSEL (0 . . . 63) for an operand.

The generation of the RSEL (0 . . . 63) string has been described herein for a single operand, but it will be appreciated by a person skilled in the art that in case of more operands/more instructions are renamed then for each operand such a plurality of RSEL (0 . . . 63) signals is generated.

With the generation of the RSEL (0 . . . 63) signals for each operand the renaming cycle shown in FIG. 5 ends.

In the next "read ROB" cycle—520—the RSEL (0 . . . 63) signals address the ReOrder Buffer (ROB). As a result the tag, data validity bit and target data (if available) will appear at the output ports of the ROB 425 for each source operand at the end of the second cycle 520. Dependent on the protocol that the IEUs support, tag, validity and data may not be read in the same cycle. It should be noted that when the execution of an instruction by the IEU starts, the tag for the result data is already known. Therefore, the RS and ROB may support a protocol in which the tag is compared and the validity is set before the actual data is written. Therefore, the read out of the validity bits and the data from the ROB may be delayed according the protocol used by the IEU to write the validity and data in separate cycles into the ROB and RS.

For the case that there is no dependency (RSEL (0 . . . 63)="00 . . . 00") the "read_ARA" is switched ON by the ROB causing the operand data to be read from the ARA (addressed by the logical address). This ends the "read ROB" cycle.

Next, in the "write RS" cycle 530 the tag, validity and data is written into the entry allocated to the renamed instructions.

In the next cycle, the "select" cycle 540, the instructions for which the data was written into the reservation station in the previous cycle will be included into the set of instruction that are considered by a select logic 418 for issue. In the IWB the select logic selects the oldest instruction that waits for issue for each IEU when the source registers are valid. This logic is implemented by a priority filter like that one described in the above referenced Patent application. As a result of the select logic a string issue (0 . . . 63) is generated for the IOUs. A bit issue(i)="1" specifies that this entry in the RS has to be issued to an IEU.

By generation of the issue (0 . . . 63) strings the select cycle ends. It should be noted that the select logic may select the instruction for issue out of program order for execution dependent on the availability of the source data for each instruction.

In the issue cycle 550, the issue (0 . . . 63) strings specifies the RS entry that has to be read out and at the end of the cycle the data, control, tag, and other bits will appear at the RS ports to the IEUs.

Finally, then the execution of the instruction is done in the cycles "exe 1", 560, and "exe 2" 570.

The tags specifying the entry where the data has to be stored in the ROB and in the RS are compared with the stored tags for the sources. In case of a match the validity bit is set and the result data is stored in the sources of the dependent instruction in the RS.

Finally the commit process will free-up the IWB entries in the original program order by copying the data from the ROB 425 to the ARA 430. As soon as the data has been written into the ARA it has become the architectural state of the processor and the IWB entries can be used again to store the new instructions dispatched by the fetch unit.

Figure 6:
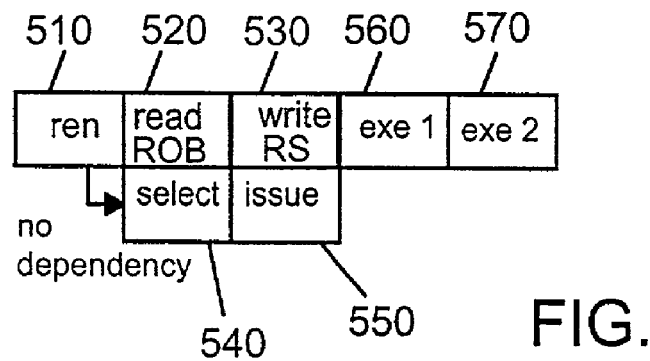
FIG. 6 is a schematic diagram showing the essentials of an inventive renaming pipeline according to FIG. 5 in the "no dependency" case.

As may be apparent from the above illustration and description the present invention discloses the introduction of a "no_dependency" signal that directly tells the select logic 418 that the renamed logic will have all its source data available. In this way, the rename/issue part of the pipeline is reduced to three stages as shown in FIG. 6 where the same reference signs apply.

Due to the generation of a "no_dependency" signal for each renamed instruction by the renaming logic, the select logic is informed already in the next cycle that it can consider the renamed instruction for the issue selection process. In parallel, with the select and the issue process the tag, validity and data is read from the ROB/ARA and written in the reservation station in the "write RS" cycle. Thereby, the data written into the RS entry is directly sent to the RS output port when the select logic has selected the instruction for issue in the previous cycle.

It should be noted that the "no_dependency" signal is always ON for the first instruction that is written into a previously empty IWB. Furthermore, the "no_dependency" signal is often ON when there is a relatively small number of instructions inside the IWB. These are, in particular, the performance critical cases. Therefore this bypass significantly improves performance.

The details of the generation of the "no_dependency" signal by the renaming logic are next described with reference to FIG. 7.

Figure 7:
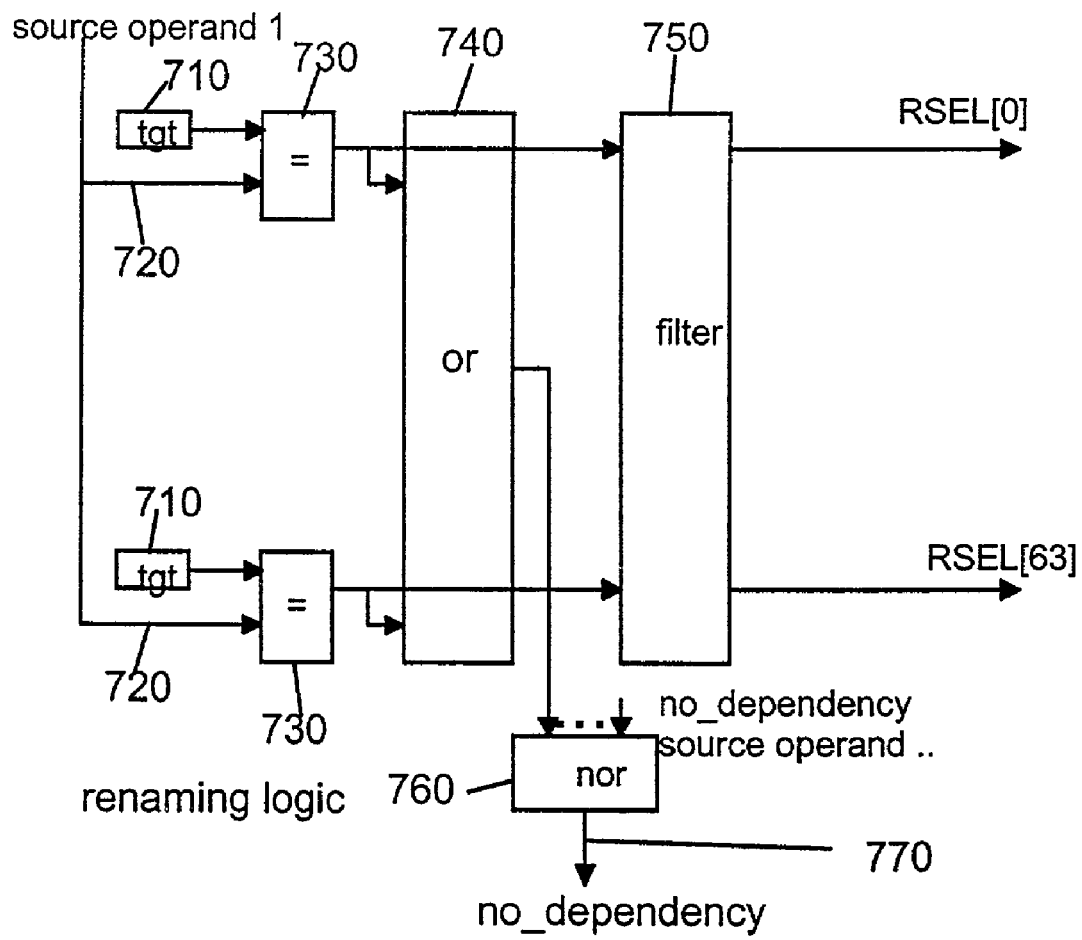
FIG. 7 is a schematic diagram showing the essentials of an inventive embodiment implementing the generation of the "no dependency" signal.

In FIG. 7, the renaming logic for a single source operand is shown. The logic for the other source operands is identical. In the compare block 730 "=" the logic target address 710 of instructions already residing in the IWB is compared with the logic source address 720 of the instruction that is being renamed. In case of a match a dependency is found. Therefore, these match signals can directly be used to generate a "no_dependency" signal for the specific source operand by a wired OR-gate 740. For each instruction the "no_dependency" signal generated for each source is the input of the "nor" gate 760 which results in the "no_dependency" signal for an instruction. The filter logic comprises a logic ANDing of the current bits with the match signals or it comprises a priority filter 750 as discussed before.

The generation of the "no_dependency" signal as shown in FIG. 7 only covers the cases in which there is no match found and therefore all data for the sources resided in the ARA 430.

Figure 8:
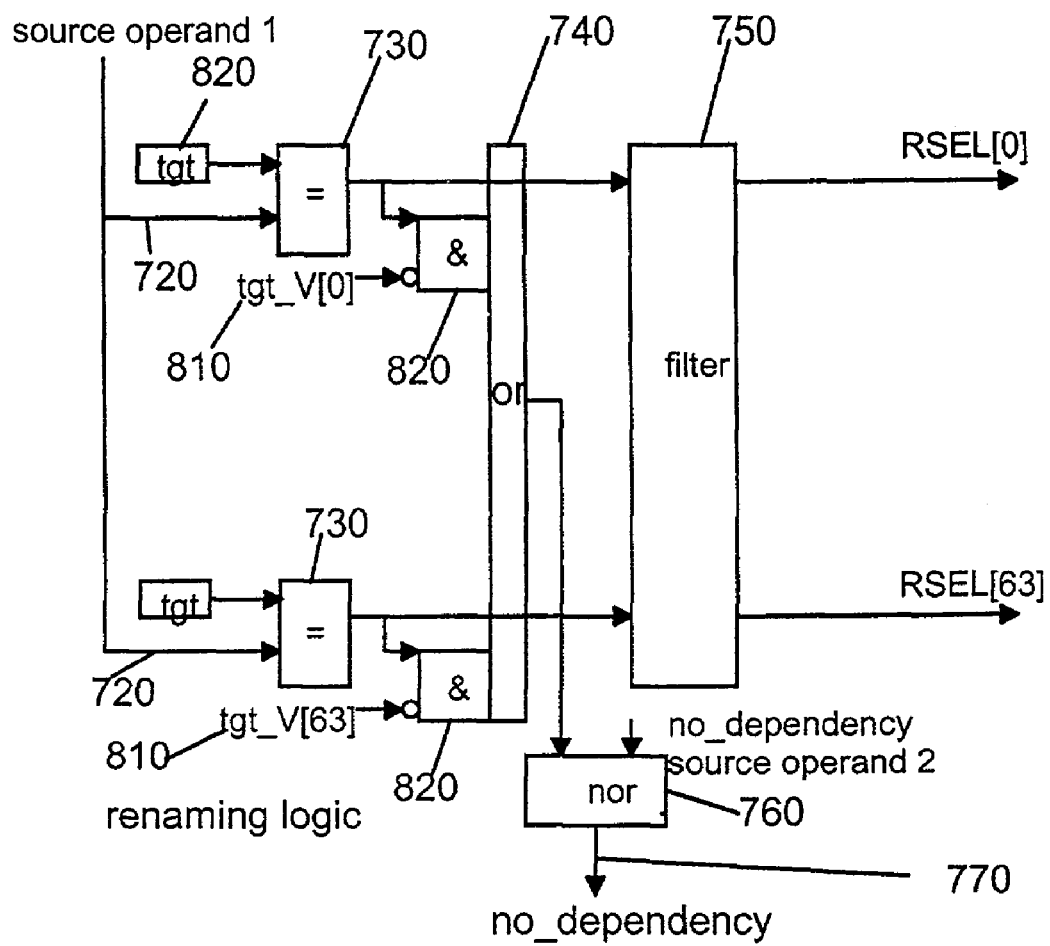
FIG. 8 is a schematic diagram showing the essentials of a further improved embodiment implementing the generation of the "no dependency" signal.

According to a preferred modification and with reference to FIG. 8 the bypass can even be made more effective when the valid bits 810 of the target registers are included into the "no_dependency" generation. Basically, now the "no_dependency" signals is ON when the target data is available in the ARA or the ROB. As can be seen in FIG. 8, an extra AND gate 820 is added to the "no_dependency" generation logic. Therefore it depends on the cycle time target if this extra delay can be tolerated.

Figure 9:
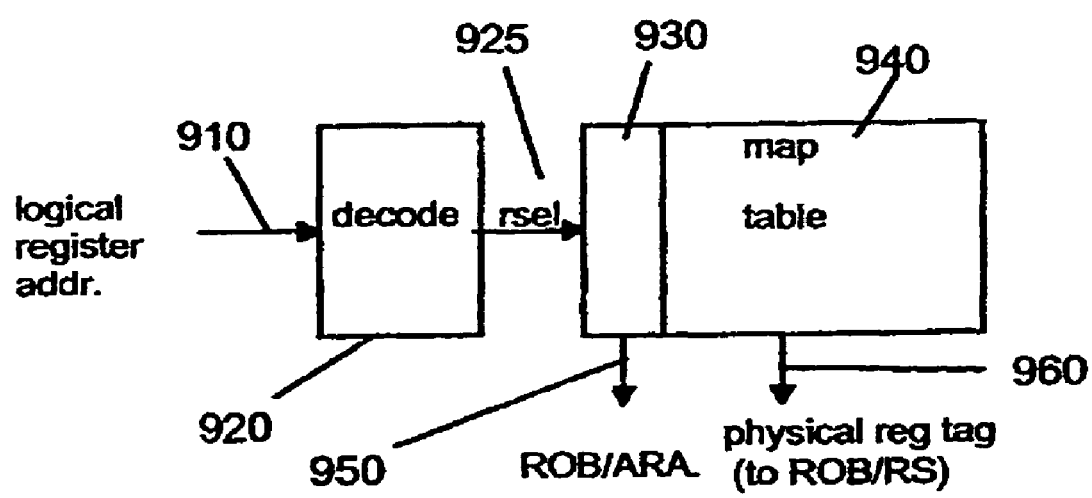
FIG. 9 is a schematic diagram showing the essentials of a prior art mapping table based renaming scheme.
Figure 10:
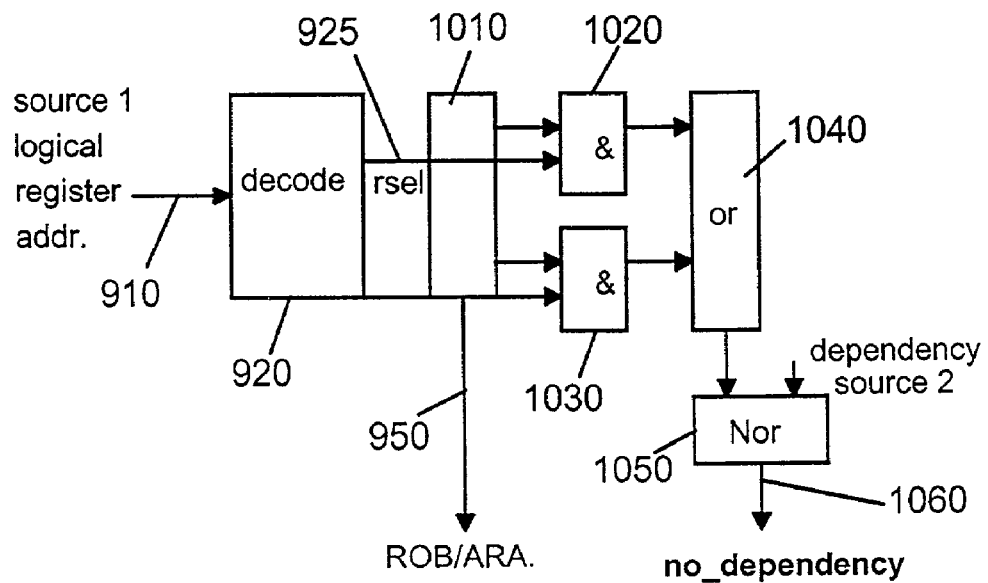
FIG. 10 is a schematic diagram showing the essentials of an inventive embodiment for a mapping table based renaming scheme and the generation of the "no dependency" signal.

Next, and with reference to FIGS. 9 and 10 the generation of a "no_dependency" signal in case of a mapping table based renaming scheme will be disclosed. In a mapping table renaming approach, after decoding 920, the source logical address 910 is directly used to read an entry in the mapping table 940. Thereby each entry in the mapping table stores the physical register tag 960 on which the logical register is currently mapped as shown in FIG. 9.

Furthermore now according to the inventional embodiment, a bit is added to each entry in the mapping table 1010 that specifies if the data resides in the ROB or that it already has been committed and is therefore found in the ARA. The no_dependency signal 1060 is then generated with help of this bit as shown in FIG. 10 by the two AND gates 1020/1030 and the wired OR 1040 and the NOR gate 1050 in an analogous way as it was described before.

In the same way as discussed before for the CAM based scheme the target valid bits could be included to generate a "no_dependency" signal to include the cases in which the source data is available in the ROB.

The number of logical registers directly define the number of entries in the map table entries. Therefore, the mapping table based rename approach is especially attractive when the number of logical registers is small as it is defined by a respective processor architecture. In the embodiment described before up to 256 logical registers could be addressed and therefore the CAM based scheme was preferred.

Figure 11:
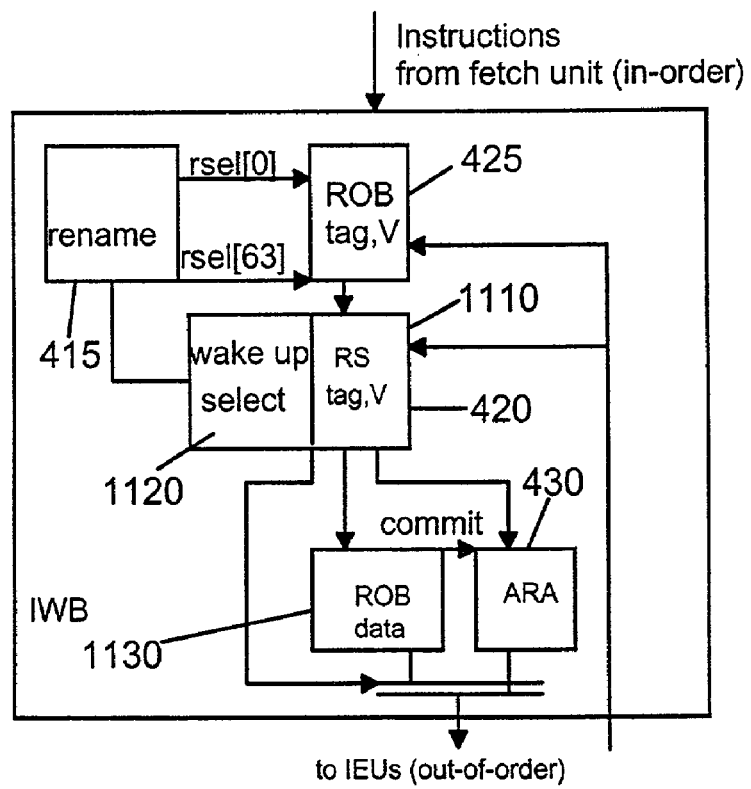
FIG. 11 is a schematic diagram showing the essentials of a Renaming scheme circuit without storage of source data in the issue queue.
Figure 12:
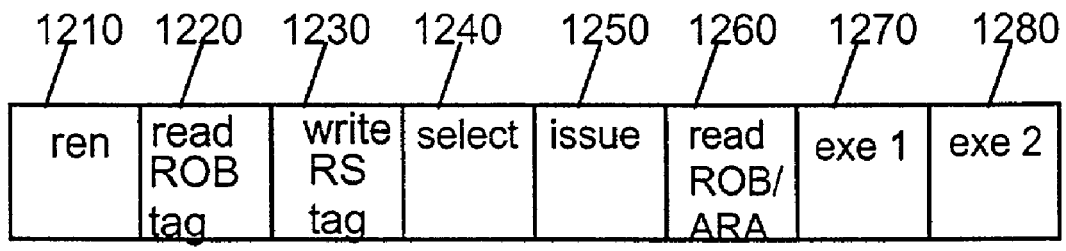
FIG. 12 is a schematic diagram showing the essentials of an inventive renaming pipeline scheme according to FIG. 11 in the "dependency" case.
Figure 13:
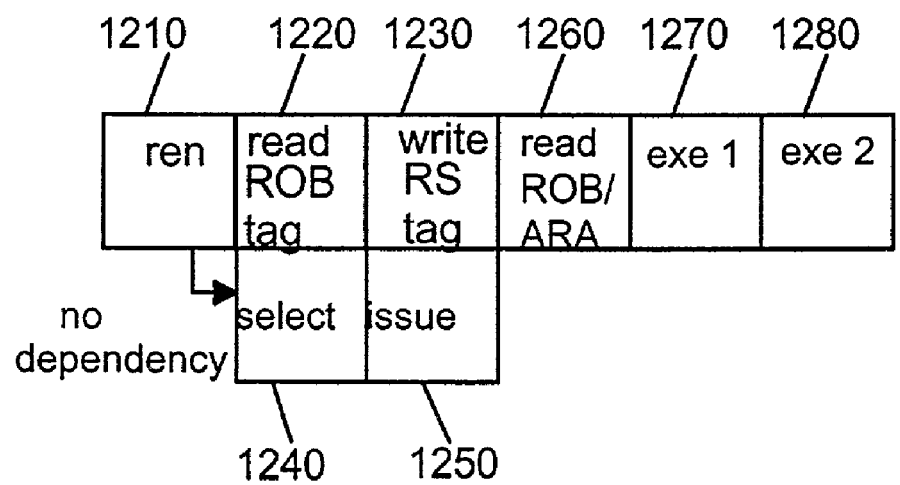
FIG. 13 is a schematic diagram showing the essentials of an inventive renaming pipeline scheme according to FIG. 12 in the "no dependency" case.

With reference now to FIGS. 11, 12 and 13 the use of the "no_dependency" signal will be disclosed next in the case of the usage of a pipeline in which the data is not stored in the reservation station.

A respective IWB structure that would result if the ROB and RS do not store data is shown in FIG. 11.

Furthermore, the resulting pipeline is shown in FIG. 12 and the pipeline in case of "no_dependency=1" is shown in FIG. 13. The respective pipeline stages are denoted from 1210 to 1280 for dependency cases and for no cases in FIG. 13.

In the ROB 425 no actual data are present now, but instead, the control tags and valid bits for accessing the source and result data. Thus, in the cycle 1220 said control data for accessing the actual data are read, and in cycle 1230 the respective tags are written into the reservation station. First in cycle 1260 the data is read from the ROB data macro or ARA before the execution starts in cycle 1270. Thus, according to the present invention those cycles can be bypassed as well, as appears from FIG. 13 in an analogous form as it was described before.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

Further variations are possible such as for example the used of a mapping table based renaming scheme as discussed in the previous section, and a single register file in which an instruction is committed by setting a commit bit for the register file entry (rather then copying the data from the ROB to the ARA data file). This however does not modify the objective of the invention by reducing the pipeline length by the generation of a "no_dependency" signal for the cases were the source data is directly available for the instruction. In this latter case, the validity of the data can be derived from including the valid bit into the "no_dependency" generation.

The present invention can be applied for both, pipelines storing only control data, e.g., OP-code and valid bits of an instruction, and for pipelines storing additionally the source data of a respective instruction.

The invention claimed is:

1. A method for operating an out-of-order processor comprised of an instruction pipeline, the method comprising the steps of:
   for detection of a dependency, determining for each current instruction involved in a renaming process that a logic target address of one or more instructions is not the same as a logic source address of said current instruction, said one or more instructions being stored in a temporary buffer associated with a pipeline process downstream of the current instruction;
   generating a no-dependency signal associated with said current instruction;
   bypassing a portion of the instruction pipeline for the current instruction if the no-dependency signal is active; and
   addressing a mapping-table-entry of a mapping table with a logical source register address of said current instruction thus determining the mapped physical target register address.

2. The method according to claim 1 in which the step of generating a no-dependency signal comprises the steps of:

comparing a plurality of logic target register addresses and the logic source register address of the current instruction;

in case the logic target register addresses and the logic source register address match, setting the no-dependency signal to not active; and generating a dependency signal for the respective source register.

3. The method according to claim 1 further comprising the step of evaluating 'valid'-bits of speculative target registers stored in a storage associated with speculatively calculated instruction result data to generate the no-dependency signal.

4. The method according to claim 1 further comprising:

reading a committed-status flag in said entry;

comparing the logic target register address and the logic source register address of the current instruction in case the no-dependency signal is not active; and generating a dependency signal for the respective source register.

5. The method according to claim 1 further comprising:

reading a committed-status flag in said entry;

comparing the logic target register address and the logic source register address of the current instruction;

in case the logic target register address and the logic source register address match, setting the no-dependency signal to not active; and generating a dependency-signal for the respective source register.

6. The method according to claim 1, further comprising partitioning the current instruction into a reorder buffer and an architectural register array, the reorder buffer configured to store speculative results of the current instruction and the architectural register array configured to store an architectural state of the processor.

7. The method according to claim 6, wherein the no-dependency signal is logically ANDed with a plurality of validity bits indicating data is available at the reorder buffer and the architectural register array.

8. A processing system having means for executing a readable machine language, said readable machine language comprises:

a first computer readable code embodied in tangible media for the detection of a dependency, determining for each current instruction involved in a renaming process that a logic target address of one or more instructions stored in a temporary buffer associated with a pipeline process downstream of the current instruction is not the same as a logic source address of said current instruction, a second computer readable code embodied in tangible media for generating a no-dependency signal associated with said current instruction, a third computer readable code embodied in tangible media for bypassing a portion of the instruction pipeline for the current instruction if the no-dependency signal is active, and a fourth computer readable code embodied in tangible media for addressing a mapping-table-entry of a mapping table with a logical source register address of said current instruction thus determining the mapped physical target register address.

9. The processing system according to claim 8 in which in case of a content-addressable memory (CAM)—based renaming scheme the first computer readable code for determining the dependency of a current instruction comprises a compare logic in which all instructions to be checked for dependency are involved and an OR gate coupled with the compare logic.

10. The processing system according to claim 9 further comprising a plurality of AND gates the input of which comprises a target register 'valid bits' signal and a respective compare logic output signal.

11. The processing system according to claim 8 in which the case of a mapping-table-based renaming scheme each mapping table entry comprises an additional instruction-committed flag, and the first computer readable code for determining the dependency of a current instruction comprises a logic for ANDing a target register 'valid bits' signal in which all instructions to be checked for dependency are involved and an OR gate coupled with the logic.

12. The processing system according to claim 8, further comprising a fifth computer readable code embodied in tangible media for partitioning the current instruction into a reorder buffer and an architectural register array, the reorder buffer configured to store speculative results of the current instruction and the architectural register array configured to store an architectural state of the processor.

13. The processing system according to claim 12, wherein the no-dependency signal is logically ANDed with a plurality of validity bits indicating data is available at the reorder buffer and the architectural register array.

14. A computer system having an out-of-order processing system, said computer system executes a readable machine language, said readable machine language comprises:

a first computer readable code embodied in tangible media for the detection of a dependency, determining for each current instruction involved in a renaming process that a logic target address of one or more instructions stored in a temporary buffer associated with a pipeline process downstream of the current instruction is not the same as a logic source address of said current instruction, a second computer readable code embodied in tangible media for generating a no-dependency signal associated with said current instruction, a third computer readable code embodied in tangible media for assigning an entry in the temporary buffer to the logic source address of said current instruction if the no-dependency signal is not active;

a fourth computer readable code embodied in tangible media for issuing the instruction operand data to an instruction execution unit without assigning the entry in the temporary buffer to the logic source address of said current instruction if the no-dependency signal is active; and a fifth computer readable code embodied in tangible media for addressing a mapping-table-entry of a mapping table with a logical source register address of said current instruction thus determining the mapped physical target register address.

15. The computer system according to claim 14, further comprising a sixth computer readable code embodied in tangible media for partitioning the current instruction into a reorder buffer and an architectural register array, the reorder buffer configured to store speculative results of the current instruction and the architectural register array configured to store an architectural state of the processor.

16. The computer system according to claim 15, wherein the no-dependency signal is logically ANDed with a plurality of validity bits indicating data is available at the reorder buffer and the architectural register array.

* * * * *